United States Patent deFries

[11] 3,875,967
[45] Apr. 8, 1975

[54] MULTIPLE-WAY VALVE

[75] Inventor: Jan R. deFries, Zurich, Switzerland

[73] Assignee: Festo-Maschinenfabrik Gottlieb Stoll, Esslingen, Germany

[22] Filed: June 5, 1972

[21] Appl. No.: 259,696

Related U.S. Application Data

[63] Continuation-in-part of Ser. No. 65,423, Aug. 20, 1970, abandoned.

[52] U.S. Cl. ........ 137/625.66; 137/625.21; 251/283
[51] Int. Cl. ............................................. F16k 11/06
[58] Field of Search ........ 251/281, 283, 282, 625.6; 137/596.18, 625.21, 625.24, 625.66; 308/.1, 9

[56] References Cited
UNITED STATES PATENTS

| 172,603 | 1/1876 | Brazelle | 251/282 |
| 345,056 | 7/1886 | Henneboehle | 137/625.21 |
| 961,466 | 6/1910 | Shade | 137/625.21 |
| 2,907,349 | 10/1959 | White | 251/283 X |
| 2,990,853 | 7/1961 | Sharp | 251/283 X |
| 3,443,593 | 5/1969 | Colombo | 137/625.24 |
| 3,559,685 | 2/1971 | deFries | 251/282 X |
| 3,707,169 | 12/1972 | Friedrichs | 251/283 X |
| 3,744,858 | 7/1973 | Weichsel | 308/DIG. 1 |
| 3,768,516 | 10/1973 | Cyphelly | 251/283 X |

FOREIGN PATENTS OR APPLICATIONS

| 20,966 | 2/1900 | Switzerland | 251/282 |
| 20,993 | 12/1890 | United Kingdom | 137/625.21 |

*Primary Examiner*—Martin P. Schwadron
*Assistant Examiner*—Robert J. Miller

[57] ABSTRACT

A multiple-way valve is formed of a valve body which is freely movably mounted in a space within a valve casing in such a way as to connect alternately various inlet and outlet passages in the wall of the casing. The valve body is normally held in position by pressure in the casing on the face of the valve body opposite the passages. In order to shift the valve body, pressure fluid is introduced below the valve body sufficient to lift it off the surface of the casing, whereupon it can be moved to another position without friction.

In a preferred form, the valve body is a disc provided with downwardly directed wings which fit in semi-annular spaces on opposite sides of wings integral with the casing. Fluid pressure is admitted into the chambers between said wings in such quantities as to turn the valve disc in one direction or the other to a limited extent.

13 Claims, 9 Drawing Figures

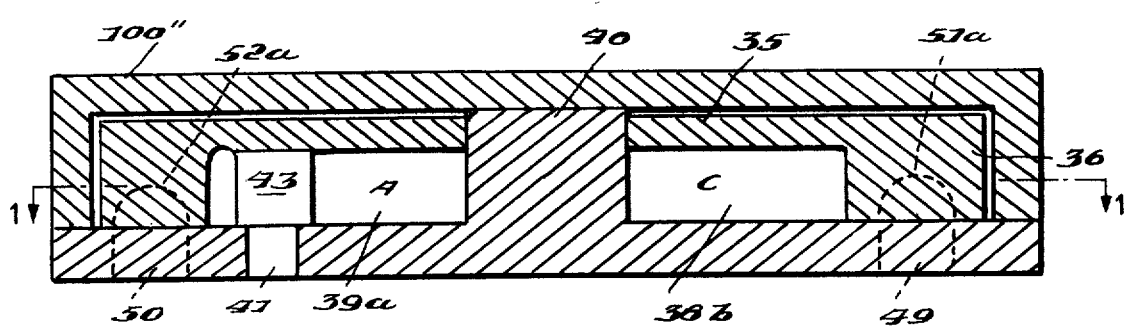

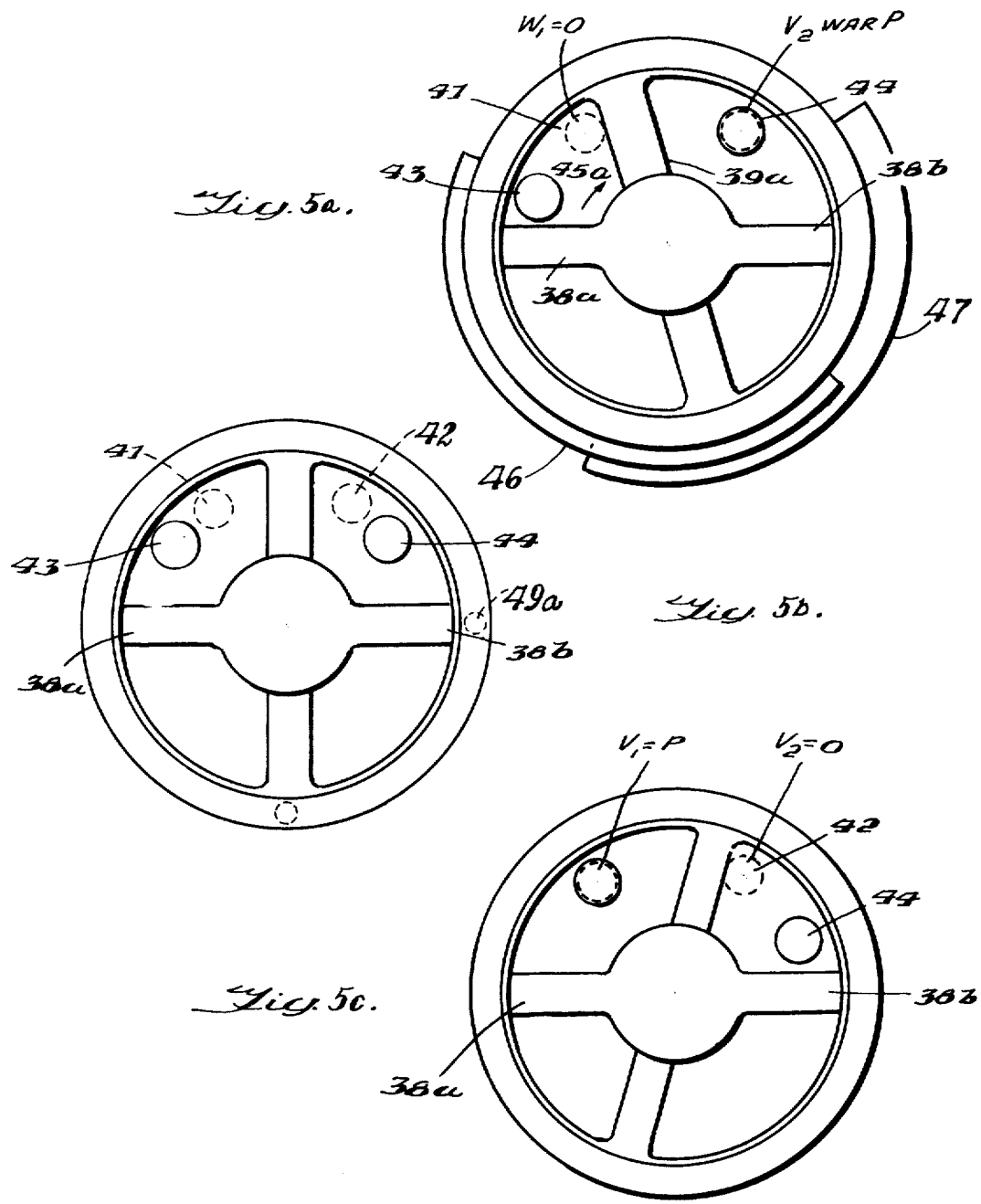

3,875,967

1

MULTIPLE-WAY VALVE

RELATED APPLICATIONS

This is a continuation-in-part of application Ser. No. 65,423, filed Aug. 20, 1970, now abandoned.

BACKGROUND OF THE INVENTION

1. Field of the Invention

The invention relates to a multiple-way valve. More particularly the invention relates to a multiple-way valve having a switch member with whose help the pipes leading to a fluid-operated device, such as a work-cylinder for fluid and gaseous pressure media, can be selectively connected with the feed pipe for the pressure medium or with an evacuation pipe leading to the free air or to a supply container.

2. The Prior Art

Multiple-way valves are known in which valve bodies slide or turn within casings to connect passages in various combination. However, in all the prior arrangements, a frictional condition exists which makes movement of the valve body difficult, if a good seal is to be maintained.

It is an object of the invention to provide a multiple-way valve having a switch member with whose help the pipes leading to a fluid pressure device, such as a work-cylinder for fluid and gaseous pressure media, can be selectively connected with the feed pipe for the pressure medium or with an evacuation pipe leading to the free air or to a supply container, wherein the switch member, in its rest position, is held against the sealing surfaces under the influence of a force acting in the direction of the sealing surfaces, the switch member, in order to carry out its switching movement, being guided transversely to the sealing surfaces or the openings of the controlled ducts, being raised from the sealing surfaces before introduction of the switching movement by application of an additional force acting on the side facing the sealing surfaces. The switch member being propelled exclusively for carrying out the switching movement hydraulically or pneumatically or by inductive electrical fields, by external mechanical means, which act by means of a fluid force, said switch member being held during this switching movement in a hovering manner between forces acting from mutually opposed sides and the switch member, after termination of the switching movement, being finally pressed against the sealing surfaces in the new switch position by turning off the additional force.

Yet another object of the invention is to provide an arrangement in which the switch member is raised from the sealing surfaces before introduction of the switching movement, and is thereby passed into a type of suspended state, and in this state brought into a new switch position, whereupon it is again pressed on the sealing surfaces. Still another object of the invention is to provide a multiple-way valve of the kind in question with which during the switching movement there is no friction between the suspended surfaces and others associated with them because of the air-cushion which is present; therefore there is no wear; in the extended position the slide is pressed by the air pressure against the surfaces; hence a leak-proof seal is provided.

The construction according to the invention is as feasible and simple as it can be with slide controls. Thus, in the arrangement according to the invention, there are the advantages of a plate-valve with close contact only on full reaching of the switch position, combined with the simple and reliable construction of the slide which is movable transversely to the control ducts. Moreover, various logical functions can be optionally combined. As in the case of electrical control circuits with analogue or logical switching, the speed of electronic impulse to the control elements cannot be utilized if the control elements must exert greater forces or cover greater distances, because the electrical signals must be transformed by induction into mechanical forces, necessitating the time for build-up and dispersion of magnetic fields. The subject matter of the invention, compared with these known arrangements, has the advantage of speed, as very rapid motors or cylinders can be incorporated as final elements, which quickly transform the pressure signal into a pushing or turning movement, quite apart from the fact that the outlay on equipment is also considerably less.

These and other objects, features and advantages of the present invention will become further apparent from the following detailed description thereof, particularly when the same is read with reference to the drawings.

BRIEF DESCRIPTION OF THE DRAWINGS

Embodiments of the invention will now be described by way of example with reference to the accompanying drawings, in which:

FIG. 2 is a section on the line 2—2 of FIG. 1;

FIGS. 5a, 5b, and 5c show the valve in different positions of rotation.

DESCRIPTION OF THE PREFERRED EMBODIMENT

Figure 1:
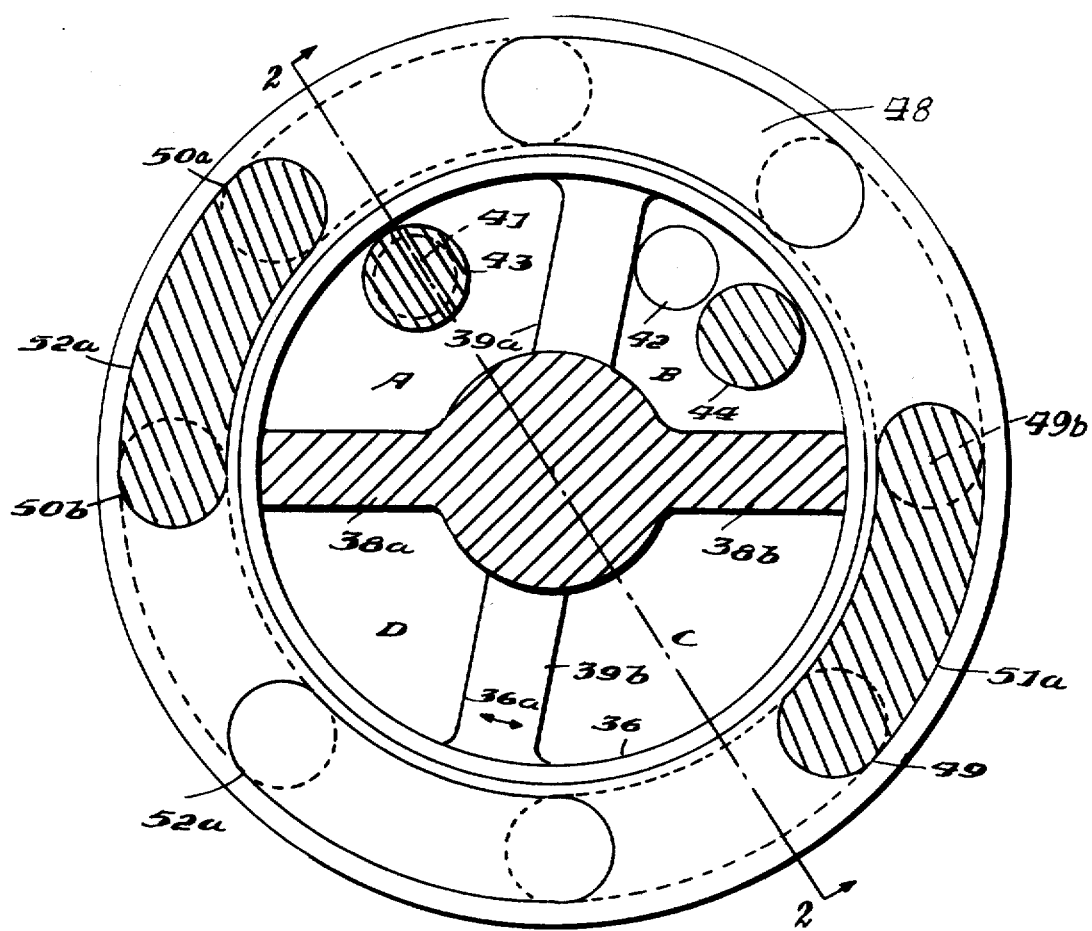
FIG. 1 is a plan view, partly in section on the line 1—1 of FIG. 2, of a valve embodying the invention.

A multiple-way valve, such as a four-way or possibly a three-way valve has a disc-shaped switch member 35, with whose help a pipe leading to a consumer, such as a work-cylinder for fluid or gaseous media, can be selectively connected with a pressure medium feed-pipe or to an evacuation pipe leading to the free air or to a supply container. Said slide is mounted in a housing 35'.

The disc-shaped switch member 35, designed as a flat slide rotatable to and fro transversely to the controlled ducts around a central axis 40, at right angles to the symmetrical plane, in the direction of arrow 36a, for example in accordance with a central angle of 30°–40°. In the region of its axial end the disc 35 has a recess enclosed by a projecting edge 36 running along the disc's circumference, and divided into four more or less equal-sized chambers A, B, C, D by two fixed wings 38a, 38b, or transverse strips, running in mutually-opposed directions, and carried by the axis 40, and by two transverse walls 39a, 39b, likewise running in mutually opposed directions, and respectively forming an angle of 90° with the fixed wings or transverse strips, and rotating with the disc forming the switch member. The feed pipes for the pressure medium open into the said chambers A, B, C, D. A fixed feed pipe 41, 42 for the pressure medium opens into both the adjacent chambers A, B of the recess at one axial end of the disc. Moreover, a spinel 43, 44 running parallel to the rotary axis 36, and extending from one axial end to the other, forming in cooperation with the fixed surfaces a stop means for limiting the rotary movement of the disc, said spindle 43, 44 having a diameter which is at least as large as that of the pipe and which, in one end position of the switch member, bears on the associated fixed wing 38a, 38b, and, in the other end position of the switch member, lies opposite the mouth of the associated feed pipe, its frontal surface forming the additional surface. If, for example, pressure is introduced through pipe 42, the switch member is raised from the seal surface, and the movable part of the switch member is turned counter-clockwise until it strikes the stop 38a. The four chambers A, B, C, D, of the switch member are each connected with the next chamber but one by ducts diagrammatically indicated at 46, 47, but which can be provided in the switch member itself. Further, the feed pipes 41, 42 for the pressure medium each open into only one chamber of each pair. The swtich member is concentrically surrounded by a switch ring 48 which contains the openings of two evacuation pipes or conduits 49a, 50a, and two junction pipes or conduits 49b, 50b to the relevant work cylinders, and two pipes or conduits 49, 50 connected to a pressure source.

In other words, referring now to FIGS. 1 to 5, the valve includes a casing 100 having a cylindrical space 101 therein to which pressure fluid can be supplied through an opening 102.

Within the casing is a valve member 35 in the form of a disc which is of a height slightly less than the thickness of the opening in the casing. This valve member consists of a disc forming a closed face and having downwardly extending therefrom an annular flange 36. In the bottom of this flange are grooves 51a and 52a each of which has an angular extent of slightly more than 45°. These grooves are adapted to connect passages in the bottom wall of the chamber, these passages including passages 49 and 50 connected to a source of pressure, 49a and 50a connected to exhaust and 49b and 50b connected to the load. In the position shown in FIG. 1, the load is connected to the pressure source, whereas when the valve disc is rotated by approximately 45° in a counter-clockwise direction the load will be connected to the exhaust passages 49a, 50a.

Other annular grooves and passages indicated in the drawings are not essential to the operation of the device, but may serve additional functions.

Upstanding from the bottom wall of the container is a central post 40 with wings 38a and 38b which extend out into engagement with the inside of the downwardly extending flange 36. The valve body has inwardly extending wings 39a and 39b, which engage the surface of the cylindrical central section of the post 40. This then divides the space within the valve member into four sectors, A, B, C, and D.

Extending downwardly from the valve body within the chambers A and B are two pins 43 and 44. In the bottom wall of the block are openings 41 and 42, opposite the chambers A and B respectively.

In the position shown in FIG. 1, it will be noted that the valve body is in its furthest clockwise position, because the pin 44 is in engagement with the wall 38b and thus prevents further movement. If now air under pressure is admitted to the pipe 41, the pressure on the bottom of the valve member will lift the whole valve body up slightly. The flow of pressure through pipe 42 into the chamber B will exert a pressure on the wall 39a of the valve body and will produce counter-clockwise rotation until the pin 43 strikes the wall 38a, at which time pipes 50a and 50b, 49a and 49b will be connected to each other. At the same time, the pin 44 will overlie the opening 42.

Figure 3A:
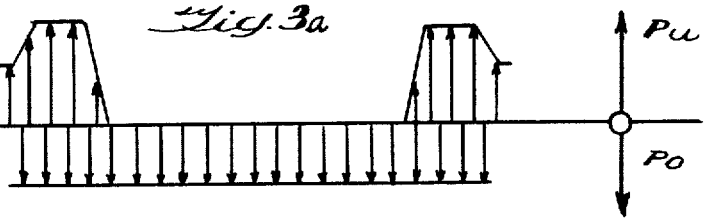
FIG. 3a is a diagram showing the pressure relations in FIG. 3.

Under ordinary conditions, as indicated by the graph of FIG. 3a, the downward pressure $P_D$ exerted on the top wall of the valve by the pressure fluid introduced through passage 102 is greater than the upward pressure $P_u$ exerted by the pressure fed fluid to passages 51a and 52a, which have a comparatively small surface area compared to that of the top surface of the valve body.

The valve body will be pressed down and held by friction in the position in which it has been set. The space a between the closed face of the valve and the top wall of the casing is large, while the space b below the valve body is zero.

Figure 4A:
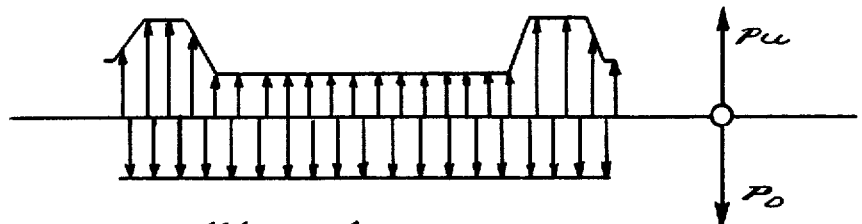
FIG. 4a is a diagram showing the pressure relations in FIG. 4.
Figure 4:
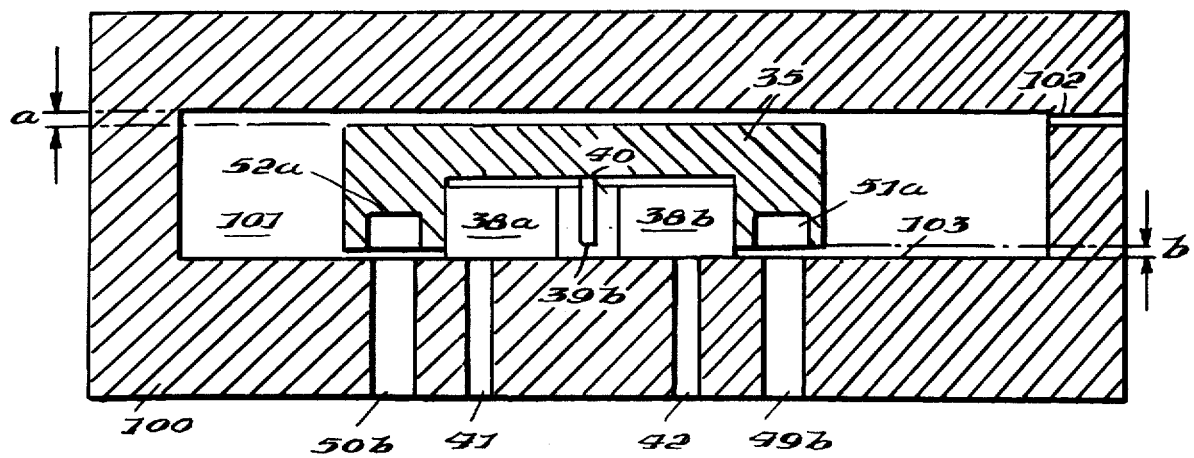
FIG. 4 shows the valve in the position of movement.

If now pressure fluid is introduced into the passages 41 and 52, as shown in FIG. 4, the valve body will be lifted because as shown in FIG. 4a, pressure $P_u$ is greater than the pressure $P_D$, and will raise the valve slightly off its seal by the amount b shown in FIG. 4, while distance a is decreased. There is then no resistance to the turning of the valve to the other end position as described above.

After the turning has been accomplished, the supply of pressure fluid to pipe 41 or 42 is cut off and the pressure on top of the valve restores it to its seat where it is tightly sealed.

Figure 3:
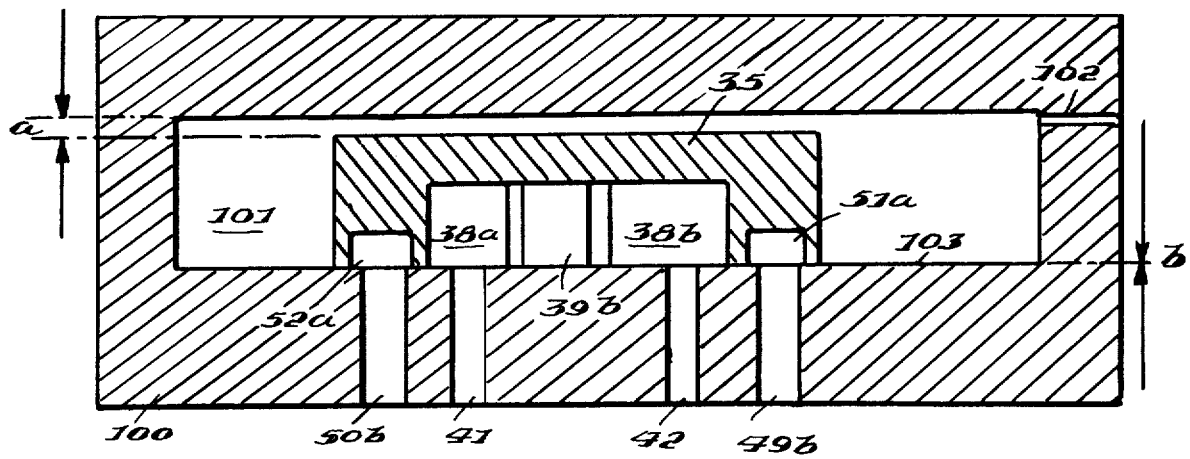
FIG. 3 shows the valve in cross-section in rest position.

The operation of the device shown in FIG. 3 is demonstrated in FIGS. 5a to 5c.

FIGS. 5a to 5c show the arrangement of FIG. 3 in three different stages in its operation.

If, with the parts as shown in FIG. 5a, pressure is admitted through the pipe 41 it raises the movable valve body and turns it in the direction of the arrow 45a until the surface of the pin 43 (passing through the intermediate position according to FIG. 5b) comes into the position of FIG. 5c. So long as no pressure works on it, the valve body, the valve body under the influence of the constant pressure working on its exposed side is placed on the sealing surface. As soon as the pressure is exerted on the valve body, the slide is lifted, so that by means of pressure through the pipe 42 which enlarges the chamber B the valve body is turned back in the direction of the arrow 45b.

The chambers A, B, C, and D of the flat disc are connected in pairs through the passages 46 and 47 (see FIG. 5a) so that each chamber communicates not with the directly neighboring chambers but with the opposite chamber, that is the chamber A through the passage 46 with the chamber B and the chamber B through the passage 47 with the chamber D.

Although my invention has been illustrated and described with reference to the preferred embodiments thereof, I wish to have it understood that it is in no way limited to the details of such embodiments, but is capable of numerous modifications within the scope of the appended claims.

Having thus fully described my invention, what I claim is:

1. A multiple-way valve comprising a casing having an internal face with a plurality of passages opening thereinto, a valve body mounted in said casing and capable of movement therein towards and from said face and in a plane parallel to said face, means to supply fluid under pressure to the interior of the casing through said passages at a pressure sufficient to lift the valve body away from such face, and means responsive to pressure fluid entering the casing to move the valve body parallel to such face, said casing having conduits therein for connection to a source of pressure fluid, a load and an exhaust, and said valve body having passage means therein operative in different positions thereof for selectively connecting the load conduit to the pressure fluid and exhaust conduits, said casing having a round opening therein, and a dividing wall fixed to the casing extending across said opening forming two chambers therein, and said valve body being rotatable about the axis of said opening and having at least one body wall dividing each of the chambers into two parts and a closed face, and said means to lift the valve body and to move the valve body comprising means to admit pressure fluid to said chamber parts.

2. A multiple-way valve as claimed in claim 1, in which said valve body moving means includes surfaces on the valve body positioned transversely of the direction of such movement to be acted on by pressure fluid introduced through such passages.

3. A multiple-way valve as claimed in claim 2, in which said valve body has outwardly open notches in the face opposite said casing space, the walls of the notches transverse to said space constituting said surfaces.

4. A multiple-way valve as claimed in claim 1, in which said passage means extend circumferentially within the valve body.

5. A multiple-way valve as claimed in claim 1, in which said valve body has two walls dividing each of said chambers into two parts, and means connecting alternate parts to each other.

6. A multiple-way valve as claimed in claim 1, in which said casing has a central part with a cylindrical surface and said body wall engages said cylindrical surface.

7. A multiple-way valve as claimed in claim 1, in which said means for admitting pressure fluid includes openings in the casing opposite the closed face of the valve body, and posts on the valve body extending from the closed face and movable into positions above said openings.

8. A multiple-way valve as claimed in claim 7, in which said posts limit the turning movement of said valve body by engagement with said dividing wall, and are positioned for one post to overlie one of the holes when the other post is in engagement with the dividing wall.

9. A multiple-way valve as claimed in claim 8, in which said valve body has two walls dividing each of said chambers into two parts, and means connecting alternate parts to each other.

10. A multiple-way valve as claimed in claim 9, in which said passage means extend circumferentially within the valve body.

11. A multiple-way valve as claimed in claim 10, in which said casing has a central post with a cylindrical surface and said body wall engages said cylindrical surface.

12. A multiple-way valve as claimed in claim 8, in which said passage means extend circumferentially within the valve body.

13. A multiple-way valve as claimed in claim 12, in which said casing has a central post with a cylindrical surface and said body wall engages said cylindrical surface.

* * * * *